(12) United States Patent
Gutwein

(10) Patent No.: US 11,760,494 B2
(45) Date of Patent: Sep. 19, 2023

(54) CONTINUOUS STACKED DUAL WRAP TUBE END CLOSURE FOR ANTI-ICING SYSTEMS

(71) Applicant: GOODRICH CORPORATION, Charlotte, NC (US)

(72) Inventor: Erich D. Gutwein, Hinckley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 22 days.

(21) Appl. No.: 17/200,793

(22) Filed: Mar. 13, 2021

(65) Prior Publication Data
US 2021/0309375 A1    Oct. 7, 2021

Related U.S. Application Data

(60) Provisional application No. 63/004,313, filed on Apr. 2, 2020.

(51) Int. Cl.
*B64D 15/16* (2006.01)
*B64C 29/00* (2006.01)
*B64D 15/22* (2006.01)

(52) U.S. Cl.
CPC ........ *B64D 15/166* (2013.01); *B64C 29/0033* (2013.01); *B64D 15/22* (2013.01)

(58) Field of Classification Search
CPC .................................................... B64D 15/166
See application file for complete search history.

(56) References Cited

U.S. PATENT DOCUMENTS

| | | | | |
|---|---|---|---|---|
| 2,446,328 A | * | 8/1948 | Heston ................. | B64D 15/166 244/134 A |
| 2,536,739 A | * | 1/1951 | Greene ................. | B64D 15/166 244/134 A |
| 2,568,669 A | * | 9/1951 | Totheroh .............. | B64D 15/166 244/134 A |
| 2,957,662 A | * | 10/1960 | Hess .................... | B64D 15/166 244/134 R |
| 3,604,666 A | | 9/1971 | Achberger | |
| 4,747,575 A | * | 5/1988 | Putt ..................... | B64D 15/166 251/30.02 |
| 5,098,037 A | | 3/1992 | Leffel et al. | |

(Continued)

FOREIGN PATENT DOCUMENTS

| | | |
|---|---|---|
| GB | 518180 | 2/1940 |
| GB | 595399 | 12/1947 |

OTHER PUBLICATIONS

European Patent Office, European Search Report dated Nov. 16, 2021 in Application No. 21166755.5.

(Continued)

*Primary Examiner* — Philip J Bonzell
*Assistant Examiner* — Michael B. Kreiner
(74) *Attorney, Agent, or Firm* — SNELL & WILMER L.L.P.

(57) ABSTRACT

An anti-icing system may comprise a deicing boot of an elastomeric material comprising a plurality of tubes, wherein the deicing boot comprises a first set of tubes and a second set of tubes, wherein each of the first set of tubes and the second set of tubes have a corresponding end, and wherein the corresponding end is coupled to a continuous dual wrap end closure.

6 Claims, 11 Drawing Sheets

(56) References Cited

U.S. PATENT DOCUMENTS

| | | | | |
|---|---|---|---|---|
| 5,112,011 | A * | 5/1992 | Weisend, Jr. ........ | B64D 15/166 244/134 A |
| 5,248,116 | A * | 9/1993 | Rauckhorst .......... | B64D 15/166 244/134 A |
| 5,275,362 | A | 1/1994 | Wwisend, Jr. et al. | |
| 5,310,142 | A * | 5/1994 | Weisend, Jr. ........ | B64D 15/166 244/134 A |
| 5,337,978 | A * | 8/1994 | Fahrner ................ | B64D 15/166 244/134 A |
| 5,393,014 | A * | 2/1995 | Weisend, Jr. ........ | B64D 15/166 137/625.21 |
| 5,449,133 | A | 9/1995 | Ely et al. | |
| 6,247,669 | B1 * | 6/2001 | Rauckhorst, III ... | B64D 15/166 244/134 A |
| 6,443,394 | B1 * | 9/2002 | Weisend, Jr. ........ | B64D 15/166 244/134 A |
| 9,598,176 | B2 * | 3/2017 | Giamati ................ | G01R 31/54 |
| 10,669,034 | B2 * | 6/2020 | Schomer ............. | B64D 15/166 |
| 10,780,983 | B2 * | 9/2020 | Hunter ................ | B64D 15/166 |
| 2002/0084382 | A1 | 7/2002 | Christ | |
| 2018/0362167 | A1 | 12/2018 | Schomer | |

OTHER PUBLICATIONS

European Patent Office, European Partial Search Report dated Aug. 6, 2021 in Application No. 21166755.5.

\* cited by examiner

CONTINUOUS STACKED DUAL WRAP TUBE END CLOSURE FOR ANTI-ICING SYSTEMS

CROSS-REFERENCE TO RELATED APPLICATIONS

This application claims priority to, and the benefit of, U.S. Provisional Patent Application No. 63/004,313, filed Apr. 2, 2020 and titled "CONTINUOUS STACKED DUAL WRAP TUBE END CLOSURE FOR ANTI-ICING SYSTEMS," which is incorporated by reference herein in its entirety for all purposes.

FIELD

The disclosure relates generally to ice protection systems, more specifically, to anti-icing or ice protection systems for aircraft including mechanical elements.

BACKGROUND

In operation, aircraft may experience conditions in which icing may occur. For example, a propel blade of an aircraft, as well as other parts of the aircraft such as the wing leading edge or the empennage, may experience the formation of ice when operating in cold or below-freezing temperatures. The formation of such ice may dramatically alter one or more flight characteristics of the aircraft. For example, the formation of ice may deleteriously affect the aerodynamics of the aircraft and add additional undesirable weight, induce undesirable vibrations, as well as generate a hazard when such ice breaks off and potentially strikes another portion of the aircraft. For example, ice breaking loose from the aircraft may be ingested by the aircraft engine, thereby damaging the engine, or may strike the fuselage or other aerodynamic surfaces.

SUMMARY

In various embodiments, anti-icing system is disclosed comprising a deicing boot of an elastomeric material comprising a plurality of tubes, wherein the deicing boot comprises a first set of tubes and a second set of tubes, wherein each of the first set of tubes and the second set of tubes have a first end and a second end, and wherein at least one of the first end or the second end includes a continuous dual wrap end closure.

In various embodiments, the elastomeric material comprises at least one of a synthetic rubber, a natural rubber, or a polyurethane. In various embodiments, the first set of tubes extends along an axis parallel to the second set of tubes. In various embodiments, the anti-icing system includes a second deicing boot of the elastomeric material. In various embodiments, the continuous dual wrap end closure comprises a continuous non-elastomeric tape. In various embodiments, the continuous non-elastomeric tape defines a first layer and a second layer. In various embodiments, the ends of the first set of tubes are enclosed by the first layer and the ends of the second set of tubes are enclosed by the second layer. In various embodiments, each of the plurality of tubes are coupled relatively between a separating strip, wherein an end portion of the separating strip is enclosed by the first layer. In various embodiments, a gum ply layer is bonded relatively between the first layer and the second layer. In various embodiments, a first midline strip is bonded along a dorsal surface midline of the first layer.

In various embodiments control system for an anti-icing system is disclosed comprising a deicing boot, a controller, and a tangible, non-transitory memory configured to communicate with the controller, the tangible, non-transitory memory having instructions stored thereon that, in response to execution by the controller, cause the controller to perform operations comprising receiving an enable command from a control interface, polling a sensor for a sensor data, receiving the sensor data from the sensor, passing the sensor data to an ice protection logic, determining via the ice protection logic an icing condition, and providing a compressed gas to the deicing boot.

In various embodiments, the sensor data includes an air temperature data and a liquid water content data, wherein the ice protection logic determines the icing condition based on the air temperature data and the liquid water content data. In various embodiments, the operations further comprise receiving an activate command from the control interface, passing the activate command to the ice protection logic, and commanding the source of compressed gas to supply the compressed gas to the deicing boot via the ice protection logic and in response to the activate command. In various embodiments, the deicing boot comprises an elastomeric material having a plurality of tubes, wherein the plurality of tubes of the deicing boot includes a first set of tubes and a second set of tubes, and wherein the operations further comprise inflating the first set of tubes with the compressed, inflating the second set of tubes with the compressed, and inflating the first set of tubes and the second set of tubes with the compressed gas simultaneously. In various embodiments, each of the first set of tubes and the second set of tubes have a corresponding end, and wherein the corresponding end is coupled to a continuous dual wrap end closure. In various embodiments, the continuous dual wrap end closure comprises a continuous non-elastomeric tape. In various embodiments, the continuous non-elastomeric tape defines a first layer and a second layer, wherein the ends of the first set of tubes are enclosed by the first layer and the ends of the second set of tubes are enclosed by the second layer. In various embodiments, each of the plurality of tubes are coupled relatively between a separating strip, wherein an end portion of the separating strip is enclosed by the first layer, wherein a gum ply layer is bonded relatively between the first layer and the second layer, and wherein first midline strip is bonded along a dorsal surface midline of the first layer.

In various embodiments, a method of de-icing comprises receiving, by a controller, an enable command from a control interface, polling, by the controller, a sensor for a sensor data, receiving, by the controller, the sensor data from the sensor, passing, by the controller, the sensor data to an ice protection logic, determining, by the controller via the ice protection logic, an icing condition, and commanding, by the controller, a source of compressed gas to supply a compressed gas to the deicing boot, wherein the sensor data includes an air temperature data and a liquid water content data, wherein the ice protection logic determines the icing condition based on the air temperature data and the liquid water content data.

In various embodiments, the method may include receiving an activate command from the control interface, passing the activate command to the ice protection logic, and commanding via the ice protection logic and in response to the activate command the source of compressed gas to supply the compressed gas to the deicing boot. The method may include inflating a first set of tubes with the compressed gas, inflating a second set of tubes with the compressed gas, and inflating the first set of tubes and the second set of tubes with the compressed gas simultaneously, wherein the deicing boot comprises an elastomeric material having a plurality of tubes, wherein the plurality of tubes of the deicing boot includes the first set of tubes and the second set of tubes.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The use of terms such as "above," "below," "upper," "lower," "forward," "aft", "inboard", "outboard", "dorsal", "ventral" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
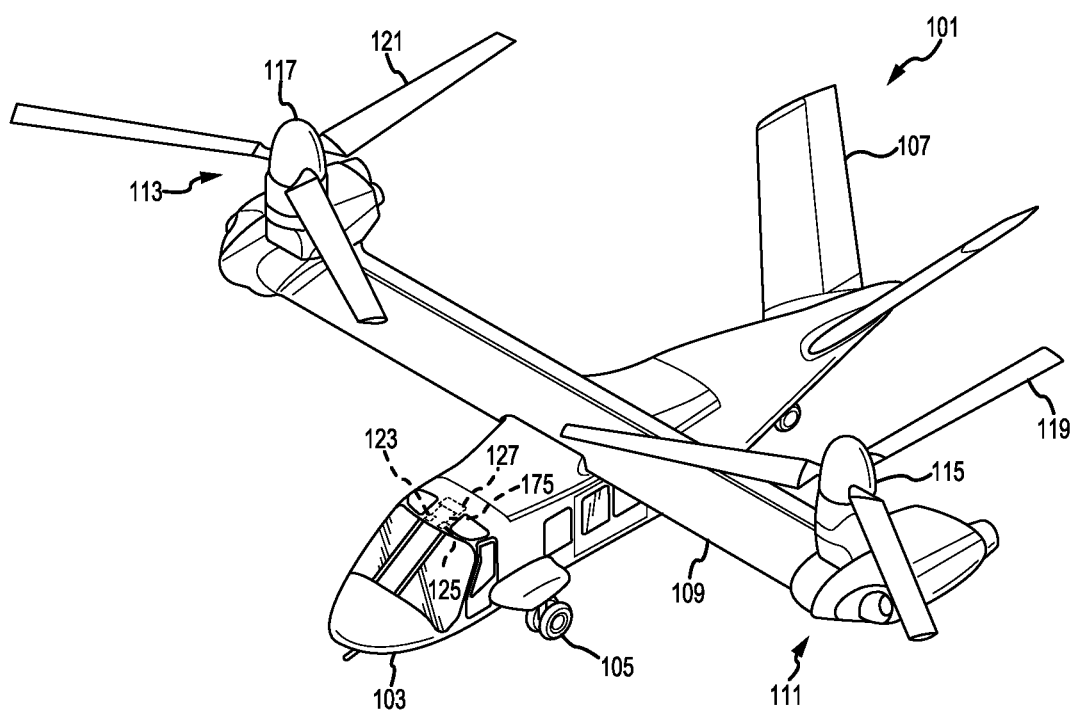
FIG. 1A illustrates a perspective view of a tiltrotor aircraft in helicopter mode, in accordance with various embodiments.
Figure 1B:
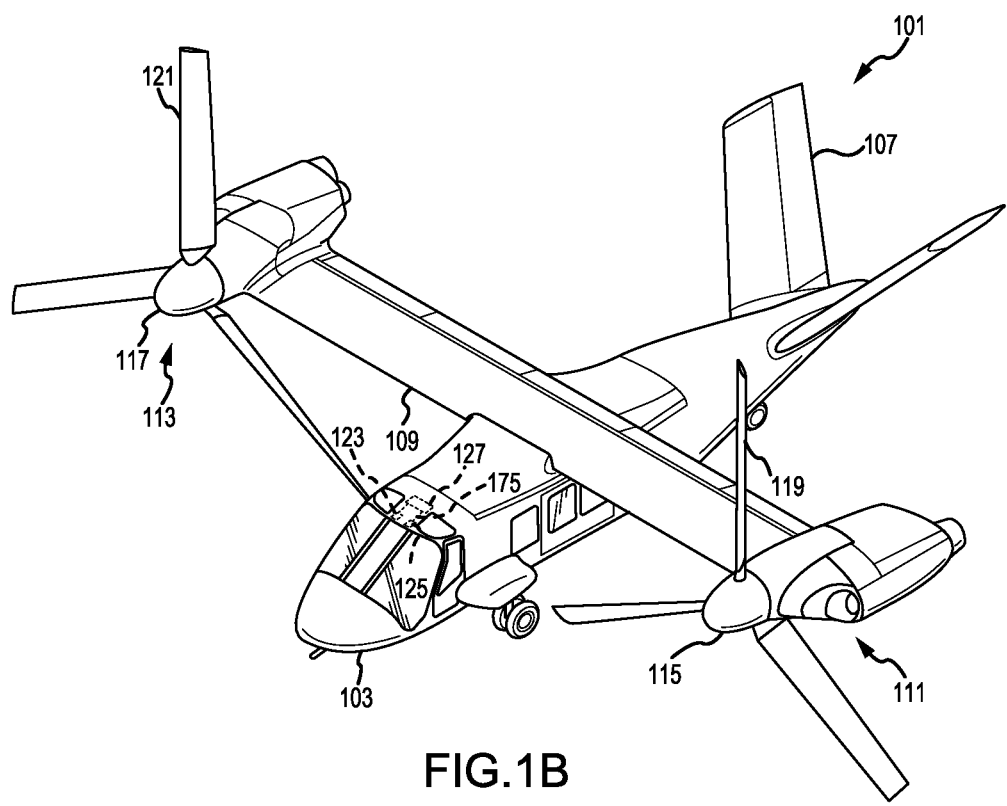
FIG. 1B illustrates a perspective view of a tiltrotor aircraft in airplane mode, in accordance with various embodiments.

In various embodiments and with reference to FIGS. 1A and 1B, an aircraft such as, for example, tiltrotor aircraft 101 is illustrated. Although depicted with reference to tiltrotor aircraft 101, it will be appreciated that the ice protection system and methods therefor may be used on other rotary aircraft, including helicopters, tilt wing aircrafts, quad tiltrotor aircraft, unmanned aerial vehicles (UAVs), and other vertical lift or VTOL aircrafts, or can further be used with any device configured with a rotor blade and/or airfoil susceptible to an ice buildup, including fixed wing aircraft, turbine blades, devices with propellers, windmills, and wind turbines.

Tiltrotor aircraft 101 may include a fuselage 103, a landing gear 105, a tail member 107, a wing 109, a first propulsion system 111, and a second propulsion system 113. Each propulsion system 111, 113 includes a fixed engine such as, for example, a gas turbine engine and a rotatable proprotor 115, 117, respectively. Each rotatable proprotor 115, 117 has a plurality of rotor blades 119, 121, (i.e., proprotor blades) respectively, associated therewith. The position of proprotors 115, 117, as well as the pitch of rotor blades 119, 121, can be selectively controlled in order to selectively control direction, thrust, and lift of tiltrotor aircraft 101.

FIG. 1A illustrates tiltrotor aircraft 101 in helicopter mode, in which proprotors 115 and 117 are positioned substantially vertical to provide a lifting thrust. FIG. 1B illustrates tiltrotor aircraft 101 in an airplane mode, in which proprotors 115,117 are positioned substantially horizontal to provide a forward thrust in which a lifting force is supplied by wing 109. It should be appreciated that tiltrotor aircraft can be operated such that proprotors 115,117 are selectively positioned between airplane mode and helicopter mode, which can be referred to as a conversion mode.

Figure 2:
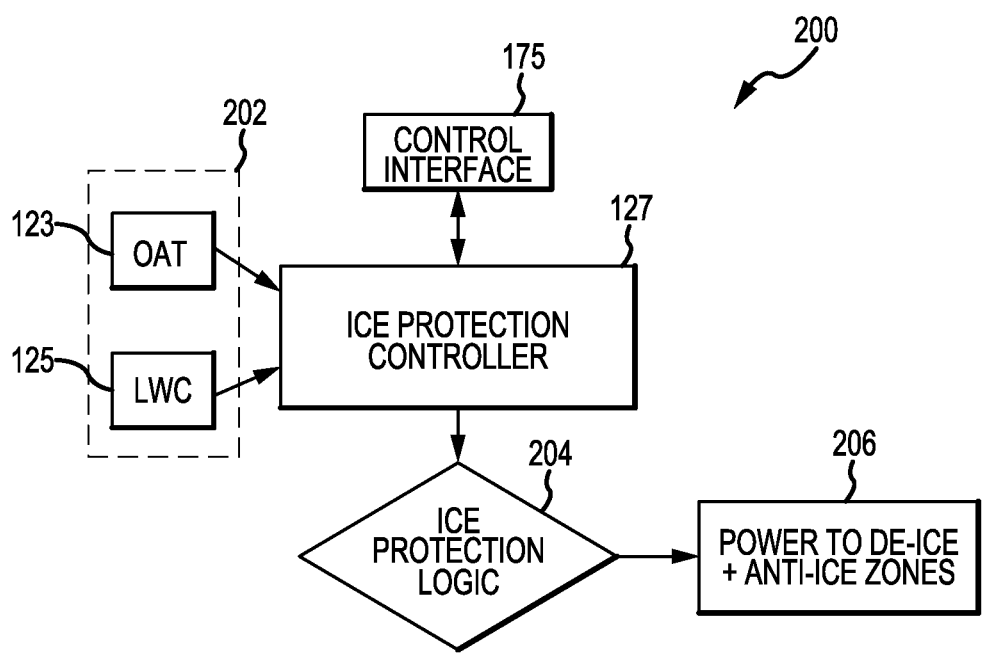
FIG. 2 illustrates a schematic block diagram of a control system for anti-icing, in accordance with various embodiments.

In various embodiments and with additional reference to FIG. 2, a control system 200 for aircraft anti-icing is illustrated in accordance with various embodiments. Tiltrotor aircraft 101 includes a plurality of sensors 202 to monitor and measure characteristics of aircraft 101. The sensors 202 may be coupled to or in direct electronic communication with aircraft systems such as, for example, propulsion systems 111, 113. The sensors 202 may comprise a temperature sensor, a torque sensor, a speed sensor, a pressure sensor, a position sensor, an accelerometer, or any other suitable measuring device known to those skilled in the art. The sensors 202 may be configured to measure a characteristic of an aircraft system or component. For example, the fuselage 103 may include a sensor 123 for sensing outside air temperature (OAT) and a sensor 125 for sensing the liquid water content (LWC) of the air passing over the fuselage 103. Sensors 202 such as sensors 123 and 125 may be configured to transmit the measurements to a controller 127, thereby providing sensor feedback about the aircraft system to controller 127. The sensor feedback may be, for example, a speed signal, or may be position feedback, temperature feedback, pressure feedback or other data. In this regard, sensors 123 and 125 may be in electrical communication with a controller 127.

In various embodiments, controller 127 may be in electronic communication with a pilot through a control interface 175, for example, a set of switches, buttons, a multifunction display, and/or the like that a pilot can operate. The control interface 175 may display information such as sensor data from the sensors 202 or processed information from the controller 127. The control interface may output command signals to the controller 127 in response to receiving an interaction via the control interface. In various embodiments, the command signals may be used as an input to an ice protection logic 204 of the controller 127. The ice protection logic 204 may control, via controller 127, various elements of an anti-icing system of the aircraft 101 such as, for example, one or more compressors and/or pneumatic valves.

Figure 3A:
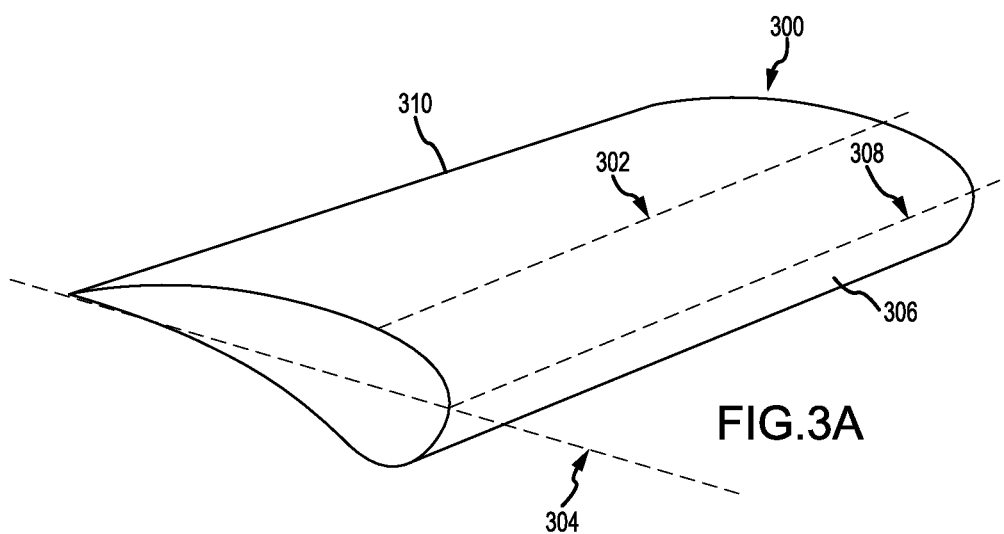
FIG. 3A illustrates a partial perspective view of an exemplary airfoil, in accordance with various embodiments.
Figure 3B:
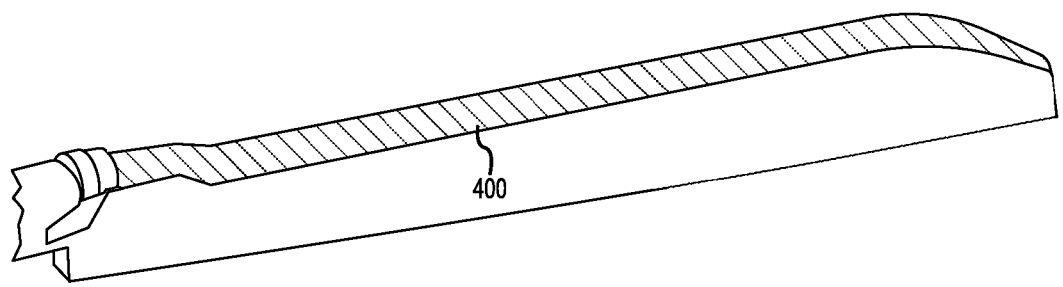
FIG. 3B illustrates an anti-icing system of an airfoil, in accordance with various embodiments.

In various embodiments, and with additional reference to FIGS. 3A and 3B an exemplary airfoil 300 (e.g., such as one of rotor blades 119, 121 or wing 109) is illustrated. FIG. 3A illustrates partial perspective view of the airfoil 300. Airfoil 300 may be is susceptible to an ice buildup. Airfoil 300 includes a spanwise axis 302, a chordwise axis 304, a leading edge 306, a leading edge axis 308, and a trailing edge 310. As illustrated in FIG. 3B, airfoil 300 comprises an anti-icing system 400. Anti-icing system 400 may comprise one or deicing boots (e.g., a first deicing boot and a second deicing boot) of an elastomeric material which may be coupled to the leading edge 306 of the airfoil 300 as denoted by the shaded area.

An anti-icing system 400 includes one or more deicing boots (i.e., a first deicing boot, a second deicing boot, etc.) configured to mechanically disrupt ice formation at the leading edge of the airfoil 300. The deicing boot along the spanwise axis 302 between the inboard and outboard edge of the airfoil 300 and wraps over the dorsal and ventral surface of the airfoil 300. In this regard, the anti-icing system 400 extends along the chordwise axis 304 aft of the leading edge relatively above and below the leading edge axis 308. Stated another way, the anti-icing system 400 including a deicing boot (such as, for example, deicing boot 402) may be wrapped around the leading edge toward the trialing edge.

Figure 4A:
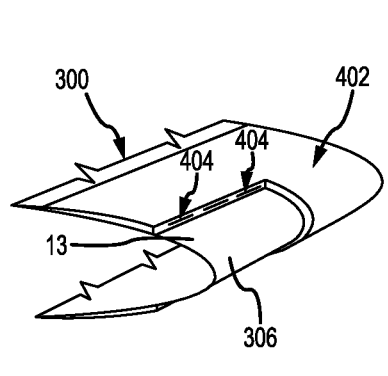
FIG. 4A illustrates a perspective cross section of an anti-icing system, in accordance with various embodiments.
Figure 4B:
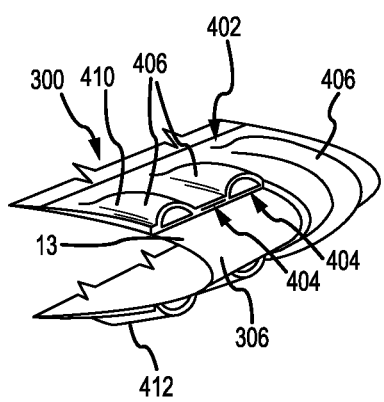
FIG. 4B illustrates a perspective cross section of an anti-icing system, in accordance with various embodiments.
Figure 4C:
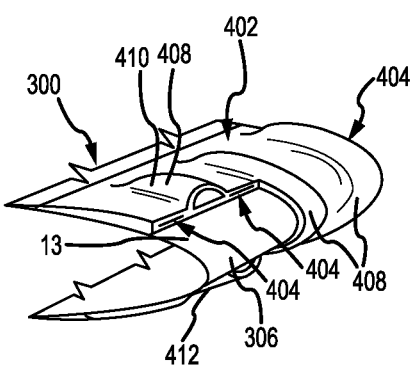
FIG. 4C illustrates a perspective cross section of an anti-icing system, in accordance with various embodiments.

In various embodiments and with additional reference to FIGS. 4A, 4B, and 4C, anti-icing system 400 is illustrated in perspective cross section in various stages of operation. Anti-icing system 400 includes a deicing boot 402 which may be coupled to an aircraft component susceptible to an ice buildup such as, for example, an inlet (e.g., oil cooler inlet, engine inlet, radiator inlet), a flight control structure, an airfoil (e.g., airfoil 300 as illustrated), an empennage, a fuselage, a wing, and/or any other desired aircraft part. Deicing boot 402 includes a plurality of tubes 404. In various embodiments, the tubes 404 may be configured to include a first set 406 of tubes 404, and second set 408 of tubes 404. Each of tubes 404 includes first end 410 and second end 412, with first end 410 disposed opposite second end 412. Each of the tubes 404 may be closed at their respective ends 410, 412 by an end closure, such as a continuous dual wrap end closure configured to inhibit fluid communication relatively between the first set 406 and the second set 408 of tubes. In this way, the tubes 404 may be configured, by the continuous dual wrap end closure, to inflate in response to receiving a compressed gas.

Tubes 404 are arranged in parallel next one another and each of tubes 404 can be arranged to extend chordwise transversely over leading edge 306 of airfoil 300 between first end 410 and second end 412. In various embodiments, tubes 404 can be arranged generally parallel with the spanwise axis 302 along leading edge axis 308. As shown in FIG. 4A, all of tubes 404 are deflated when leading edge 306 of airfoil 300 is clear and free of ice. Should ice accumulate on leading edge 306 during operation of the aircraft, control system 200 may supply compressed gas (e.g., air from a source of compressed gas) to anti-icing system 400. In this regard, the controller 127 may control the deicing boot 402 and the plurality of tubes 404, a first manifold (not shown) inflates tubes 404 in first set 406 with air to break and remove the ice, as shown in FIG. 4B. For example, the controller 127 may control a first valve in fluid communication between the first manifold and the source of compressed gas. After tubes 404 in first set 406 have been inflated, tubes 404 in second set 408 are inflated with air by a second manifold (not shown) while first set 406 of tubes 404 is deflated, as shown in FIG. 4C. For example, the controller 127 may control a second valve in fluid communication between the second manifold and the source of compressed gas. In this regard, the controller 127 may enable alternating the inflation and deflation of first set 406 and second set 408 of tubes 404 tending thereby to allow the deicing boot 402 to operate with less disruption to airflow over the airfoil 300. In various embodiments, the controller 127 may control the first set 406 and the second set 408 of tubes 404 to inflate simultaneously. In various embodiments, the tubes 404 may comprise an elastomeric material such as, for example, a synthetic rubber, silicone, a natural rubber, a polyurethane, and/or the like.

In various embodiments and with additional reference to FIGS. 5A, 5B, 5C, and 6 an end (e.g. first end 410 or second end 412) of tubes 404 is illustrated in perspective detail (FIGS. 5A-5C) and cross section (FIG. 6) showing the buildup of a continuous dual wrap end closure 500. The end closure 500 comprises a continuous non-elastomeric tape 502 such as, for example, a bias cut polymer tape which is laid flat to form a first layer 600. In various embodiments, a first midline strip 504 (i.e., a midline strip) may be bonded along a dorsal surface midline of the first layer 600 of the tape 502. In this regard, the first midline strip 504 may divide the first layer 600 into an inboard portion 506 and an outboard portion 508. Ends 410 of the first set 406 of the tubes 404 may abut the first midline strip 504 and may be bonded to the dorsal surface of the inboard portion 506. In various embodiments, separating strips 510 may be interspersed between the tubes 404 and bonded therebetween. In like regard, the separating strips 510 may abut the first midline strip 504 and be bonded to the dorsal surface of inboard portion 506 of the first layer 600.

Ends 410 of the second set 408 of tubes 404 may be folded relatively inboard and away (e.g., a folded end 512) from the first layer 600 to provide clearance. The first layer 600 is folded (as indicated by arrow 514) over the first set 406 of tubes 404 by bringing the outboard portion 508 across the midline strip 504 above the inboard portion 506 (i.e., respectively facing dorsal surfaces of the first layer 600). The dorsal surface of outboard portion 508 may thereby be bonded to the first set 406 of tubes 404 by contacting the dorsal surface of the outboard portion 508 across the upper surface of the first set 406 of tubes 404. In this regard, the first set 406 of tubes 404 may be enclosed in the first layer 600 of the continuous non-elastomeric tape 502. In like regard, an end portion of the separating strips 510 is enclosed in the first layer 600 and bonded therebetween. The first midline strip 504 is similarly enclosed between the respective dorsal surfaces of the inboard portion 506 and the outboard portion 508.

Figure 5A:
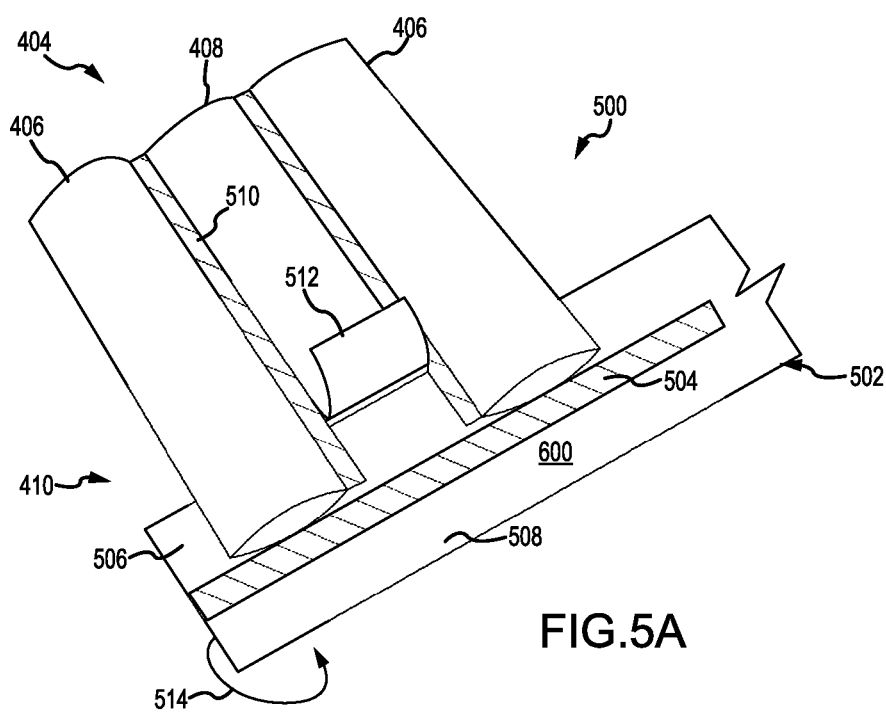
FIG. 5A illustrates a continuous dual wrap end closure of an anti-icing system, in accordance with various embodiments.
Figure 5B:
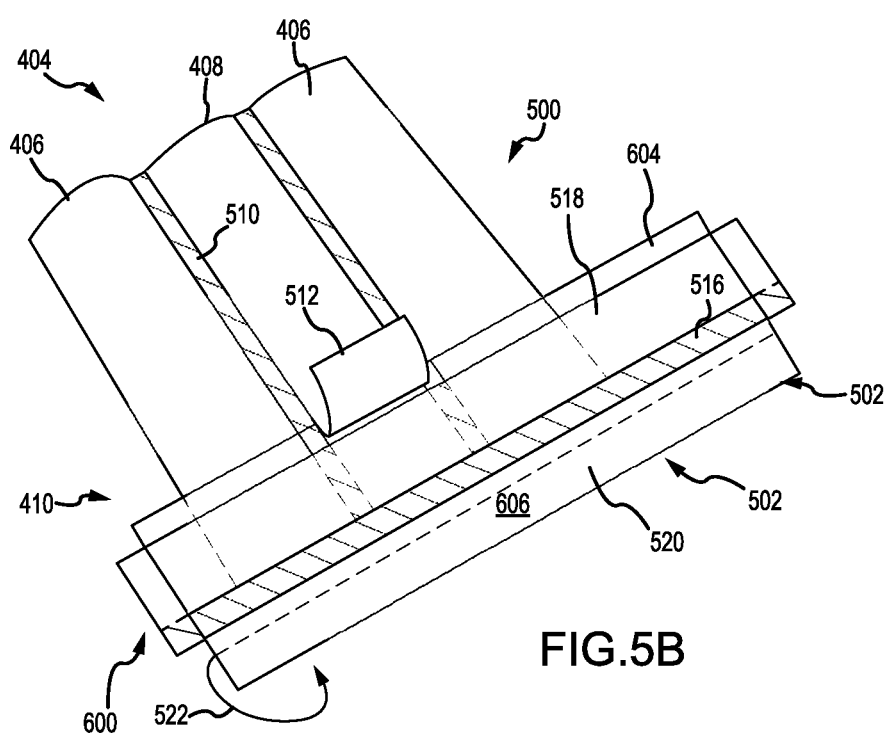
FIG. 5B illustrates a continuous dual wrap end closure of an anti-icing system, in accordance with various embodiments.
Figure 6:
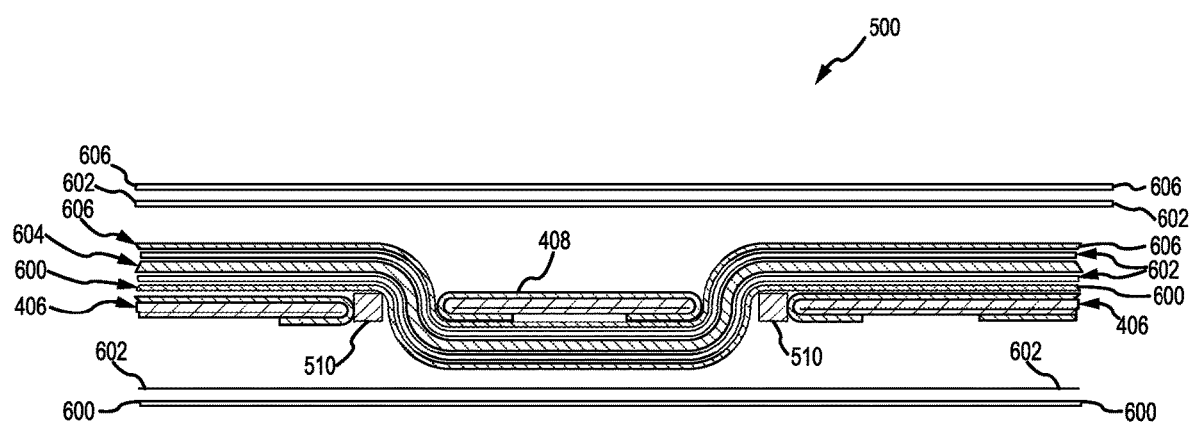
FIG. 6 illustrates a cross section a continuous dual wrap end closure of an anti-icing system, in accordance with various embodiments.

As shown in FIG. 5B, in various embodiments a gum ply layer 604 may be bonded (e.g., between layers of rubber cement 602 as shown in FIG. 6) to the first layer 600. The continuous non-elastomeric tape 502 is drawn across the gum ply layer 604 and laid flat to form a second layer 606 of the tape 502. In various embodiments, a second midline strip 516 may be bonded along a dorsal midline of the second layer 606 of the tape 502. The second midline strip 516 may divide the second layer 606 into an inboard portion 518 and an outboard portion 520. In this regard, the gum ply layer 604 may be bonded to the ventral surface of the outboard portion 508 of the first layer 600 and to the ventral surface of the inboard portion 518 of the second layer 606 (i.e., relatively between the first layer 600 and the second layer 606). The folded ends 512 of the second set 408 of tubes 404 may be folded down contact the dorsal surface of second layer 606. In various embodiments, the ends 410 of the second set 408 of tubes 404 may thereby abut the second midline strip 516 and be bonded to the inboard portion 518 and/or the second midline strip 516.

Figure 5C:
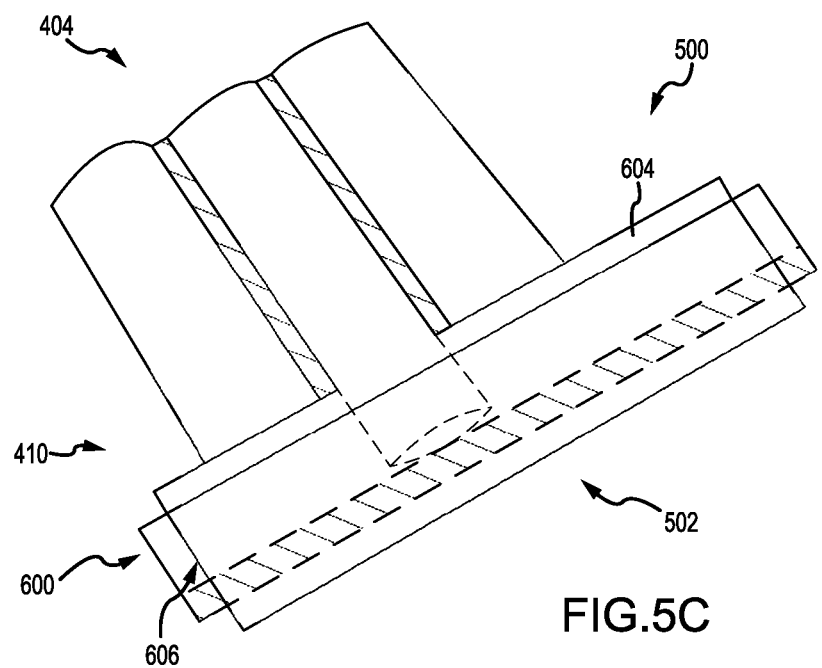
FIG. 5C illustrates a continuous dual wrap end closure of an anti-icing system, in accordance with various embodiments.

In a similar manner, the second layer 606 is folded (as indicated by arrow 522) over the second set 408 of tubes 404 by bringing the outboard portion 520 across the second midline strip 516 above the inboard portion 518. The outboard portion 520 may thereby be bonded to the second set 408 of tubes 404 by contacting the dorsal surface of the outboard portion 520 across the upper surface of the second set 408 of tubes 404. In this regard, the ends of the second set 408 of tubes 404 may be fully enclosed in the second layer 606 of the continuous non-elastomeric tape 502 as illustrated in FIG. 5C.

In various embodiments, and with renewed reference to FIG. 2, controller 127 may be integrated into computer systems onboard an aircraft, such as, for example, tiltrotor aircraft 101. In various embodiments, controller 127 may comprise a processor. In various embodiments, controller 127 may be implemented in a single processor. In various embodiments, controller 127 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 127 may comprise a processor configured to implement various logical operations in response to execution of instructions, for example, instructions stored on a non-transitory, tangible, computer-readable medium configured to communicate with controller 127.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 7:
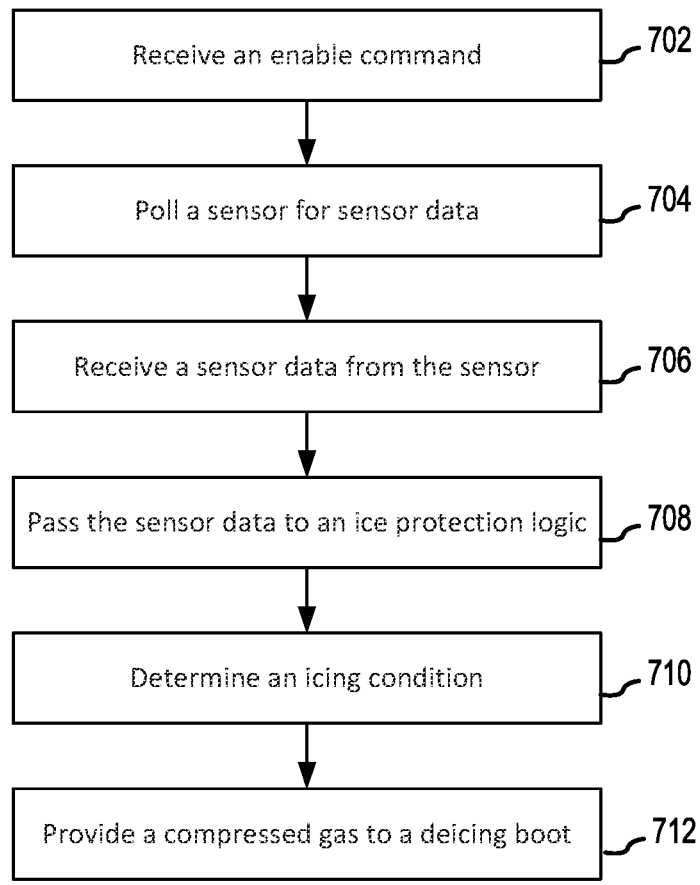
FIG. 7 illustrates a method of deicing, in accordance with various embodiments.

In various embodiments and with additional reference to FIG. 7, a method 700 of deicing is illustrated. The controller 127 may receive an activate command from the control interface 175. Controller 127 may pass the activate command to the ice protection logic 204. In response to the activate command, the ice protection logic 204 may command a source of compressed gas 206 to supply a compressed gas to one or more sets of tubes of anti-icing system 400. In this regard, controller 127 may provide a compressed gas to a deicing boot of anti-icing system 400 such as deicing boot 402, for example, by commanding the source of compressed gas to supply the compressed gas to the deicing boot. Controller 127 may receive an enable command from the control interface 175 (step 702). In response to the enable command, controller 127 may poll sensors 202 for sensor data (step 704). In response to polling sensors 202, controller 127 may receive sensor data including an air temperature data and a liquid water content data (step 706). Controller may pass the air temperature data and the liquid water content data to the ice protection logic 204 (step 708). The ice protection logic 204 may determine, based on the air temperature data and the liquid water content data, an icing condition of the aircraft (step 710). In response to determining the icing condition of the aircraft, the ice protection logic 204 may command the source of compressed gas 206 to supply the compressed gas to one or more sets of tubes of anti-icing system 400 (step 712). In this regard, controller 127 may provide a compressed gas to a deicing boot of anti-icing system 400 such as deicing boot 402 in response to an icing condition. In various embodiments, the ice protection logic 204 may be configured to alternate fluid communication with the supply of compressed gas between the first set 406 of tubes and the second set 408 of tubes in response to a time signal. For example, the controller 127 may be configured to control a valve in fluid communication between the source of compressed gas 206 and the tubes 404. In this way, controller may modulate the inflation of the first set 406 of tubes 404 and the second set 408 of tubes 404 in response to the icing condition of the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-icing system comprising:
a deicing boot of an elastomeric material comprising a plurality of tubes,
wherein the deicing boot comprises a first set of tubes and a second set of tubes,
wherein the first set of tubes has a first end and the second set of tubes as a second end,
wherein the first and the second end are coupled to a continuous dual wrap end closure configured to inhibit fluid communication between the first set of tubes and the second set of tubes, and
wherein the continuous dual wrap end closure comprises a continuous non-elastomeric tape, wherein the continuous non-elastomeric tape defines a first layer and a second layer, wherein the first end of the first set of tubes is enclosed by the first layer and the second end of the second set of tubes is enclosed by the second layer.

2. The anti-icing system of claim 1, wherein the elastomeric material comprises at least one of a synthetic rubber, a natural rubber, or a polyurethane.

3. The anti-icing system of claim 1, wherein the first set of tubes extends along an axis parallel to the second set of tubes.

4. The anti-icing system of claim 1, wherein each of the plurality of tubes are coupled relatively between a separating strip, wherein an end portion of the separating strip is enclosed by the first layer.

5. The anti-icing system of claim 1, wherein a gum ply layer is bonded relatively between the first layer and the second layer.

6. The anti-icing system of claim 1, wherein a first midline strip is bonded along a dorsal surface midline of the first layer.

* * * * *